United States Patent
Tanaka (10) Patent No.: US 10,267,631 B2
(45) Date of Patent: Apr. 23, 2019

(54) FLYING OBJECT, DETECTING DEVICE, CONTROL DEVICE, AND AIR CURRENT DETECTING METHOD

(71) Applicant: Futaba Corporation, Mobara-shi, Chiba-ken (JP)

(72) Inventor: Masahiro Tanaka, Mobara (JP)

(73) Assignee: FUTABA CORPORATION, Mobara-Shi (JP)

( * ) Notice: Subject to any disclaimer, the term of this patent is extended or adjusted under 35 U.S.C. 154(b) by 221 days.

(21) Appl. No.: 15/235,194

(22) Filed: Aug. 12, 2016

(65) Prior Publication Data

US 2017/0052055 A1 Feb. 23, 2017

(30) Foreign Application Priority Data

Aug. 21, 2015 (JP) .................. 2015-163780

(51) Int. Cl.
*G01C 5/00* (2006.01)
*G01K 3/10* (2006.01)
*G01K 7/42* (2006.01)

(52) U.S. Cl.
CPC .............. *G01C 5/005* (2013.01); *G01K 3/10* (2013.01); *G01K 7/427* (2013.01)

(58) Field of Classification Search
CPC .......... G01C 5/005; G01C 23/00; B64C 13/00
USPC ........... 73/170.02, 178 R, 384; 701/4, 5, 10; 702/144
See application file for complete search history.

(56) References Cited

U.S. PATENT DOCUMENTS

| 4,591,111 A | * | 5/1986 | Laughter | ................. | B64D 43/00 244/1 R |
|---|---|---|---|---|---|
| 2006/0056482 A1 | * | 3/2006 | Rouquette | .............. | G01C 23/00 374/1 |
| 2006/0058928 A1 | * | 3/2006 | Beard | ................... | G01C 23/005 701/11 |

* cited by examiner

*Primary Examiner* — Benjamin R Schmitt
(74) *Attorney, Agent, or Firm* — Bacon & Thomas, PLLC (57) ABSTRACT

An altitude sensor and a temperature sensor are installed at a flying object. The flying object or a control device for controlling an operation of the flying object corrects temperature information acquired by the temperature sensor to temperature information at an altitude by using altitude information acquired by the altitude sensor. The flying object or the control device determines whether an air current is ascending or descending based on temperature changes at the altitude. The temperature changes are obtained from the corrected temperature information.

10 Claims, 10 Drawing Sheets

FIG.10

FLYING OBJECT, DETECTING DEVICE, CONTROL DEVICE, AND AIR CURRENT DETECTING METHOD

CROSS-REFERENCE TO RELATED APPLICATIONS

This application claims priority to Japanese Patent Application No. 2015-163780 filed on Aug. 21, 2015, the entire contents of which are incorporated herein by reference.

FIELD OF THE INVENTION

The disclosure relates to a flying object, a detecting device, a control device, and an air current detecting method. Particularly, the disclosure relates to a flying object, e.g., a model glider or the like, and an air current detecting technique in a control device for controlling an operation of the flying object through wireless communication.

BACKGROUND OF THE INVENTION

In the case of a flying object such as a glider or the like which does not use power during flight, it is important to find ascending air current (thermal). In order to find the thermal, it is required to pay attention to changes in wind or temperatures, movement of birds or insects, shapes of clouds, or the like. However, it is difficult to find the thermal from such information without experience.

Japanese Utility Model Application Publication No. S63-189800 discloses a technique for detecting an ascending air current by comparing temperatures detected by thermosensitive devices provided at a right and a left wing.

Japanese Patent Application Publication No. 2005-82018 discloses a technique for estimating an ascending air current by measuring an air current or the like.

For example, in the case of a wireless control device and a model glider, an operator determines a thermal from movement of a fuselage of the model glider in the sky. However, this requires experience and no deflection of the fuselage. It is difficult even for a skilled person to assemble the fuselage without deflection, adjust any deflection or set a transmitter.

Further, when the fuselage is flying at a high altitude, it is difficult to detect the movement of the fuselage with naked eyes. Therefore, it is very difficult to determine the thermal from the movement of the fuselage.

Accordingly, it is required to detect an air current with high accuracy by a small and simple configuration that can be installed at a wirelessly controlled flying object.

SUMMARY OF THE INVENTION

In view of the above, the disclosure provides a detecting device, a flying object, a control device and an air current detection method for detect an air current with high accuracy by a small and simple configuration that can be installed at a wirelessly controlled flying object. In accordance with a first aspect, there is provided a detecting device to be installed at a flying object. The detecting device includes an operation unit which is configured to correct inputted temperature information to temperature information at an altitude by using inputted altitude information and generate transmission information based on the corrected temperature information.

The detecting device may further include a wireless communication unit configured to transmit the transmission information generated by the operation unit to a control device for the flying object.

The detecting device may further include a temperature sensor configured to output the temperature information to the operation unit.

The detecting device may further include an altitude sensor configured to output the altitude information to the operation unit. By employing the above-described detecting device, it becomes easy to equip the flying object with an air current detecting function.

In accordance with a second aspect, there is provided a flying object of which operation is controlled through wireless communication with a control device. The flying object includes a temperature sensor, an altitude sensor, an operation unit and a wireless communication unit. The operation unit is configured to correct temperature information detected by the temperature sensor to temperature information at an altitude by using altitude information detected by the altitude sensor and generate transmission information based on the corrected temperature information. The wireless communication unit is configured to transmit the transmission information generated by the operation unit to the control device.

The altitude of the flying object constantly changes even during level flight. Therefore, in the disclosure, the temperature information at an altitude is detected regardless of changes in the altitude of the flying object by correcting the temperature information. In other words, the temperature information in which the effect of the altitude on the temperature changes is cancelled is obtained. Further, whether the air current is ascending or descending is determined based on the temperature information at an altitude.

The operation unit generates information on temperature variation at the altitude as the transmission information.

The information on temperature variation at the altitude is proper information for determining whether the air current is ascending or descending. Therefore, by transmitting the temperature variation as a transmission information to the control device, the control device can appropriately determine whether the air current is ascending or descending.

The operation unit determines whether an air current is ascending or descending based on the temperature variation at the altitude which is obtained from the corrected temperature information and transmits information on the determination result as the transmission information.

In other words, the operation unit determines whether the air current is ascending or descending from the temperature variation at the altitude and transmits the determination result to the control device.

The operation unit corrects the temperature information and generates the transmission information during a period in which it is estimated from the altitude information that altitude changes are within a predetermined range so that the flying object is substantially in level flight.

For example, the air current determination (thermal detection or the like) can be performed during level flight, not during takeoff to a predetermined altitude or landing.

In accordance with a third aspect, there is provided a control device for controlling an operation of a flying object through wireless communication. The control device includes a notification unit, a wireless communication unit and a control unit. The wireless communication unit is configured to receive altitude information of an altitude sensor installed at a flying object and temperature information of a temperature sensor installed at the flying object.

The control unit is configured to correct the temperature information received through the wireless communication unit to temperature information at an altitude by using the altitude information received through the wireless communication unit. The control unit determines whether an air current is ascending or descending based on temperature changes at the altitude. The temperature changes are obtained from the corrected temperature information, and control an output of the notification unit based on the determination result.

In other words, the control device receives the altitude information and the temperature information from the flying object, corrects the temperature information, and determines the air current.

In accordance with a fourth aspect, there is provided an air current detection method. Temperature information of a temperature sensor installed at a flying object and altitude information of an altitude sensor installed at the flying object are acquired. The acquired temperature information is corrected to temperature information at an altitude by using the acquired altitude information. It is determined whether an air current is ascending or descending based on temperature changes at the altitude. The temperature changes are obtained from the corrected temperature information. An output of the air current determination result is notified by a control device configured to control an operation of the flying object through wireless communication.

In other words, the temperature information at an altitude is obtained regardless of changes in the altitude of the flying object and whether the air current is ascending or descending is determined based on the temperature information at the altitude.

In the disclosure, the temperature information at an altitude is obtained by correcting the detected temperature information and whether the air current is ascending or descending is determined based on the temperature information at the altitude. Therefore, the air current can be determined with high accuracy without the effect of the altitude on the temperature difference.

Further, in the disclosure, air current can be determined with high accuracy by a simple and easy configuration and thus the disclosure is suitable for a wirelessly controlled flying object and a system of a control device. A user (operator) can clearly recognize whether the flying object in the sky is riding the thermal or not and thus can control the flying object more accurately.

BRIEF DESCRIPTION OF THE DRAWINGS

The objects and features of the disclosure will become apparent from the following description of embodiments, given in conjunction with the accompanying drawings, in which.

DETAILED DESCRIPTION OF THE EMBODIMENTS

First Embodiment

A first embodiment will be described with reference to FIGS. 1 to 5.

Figure 1:
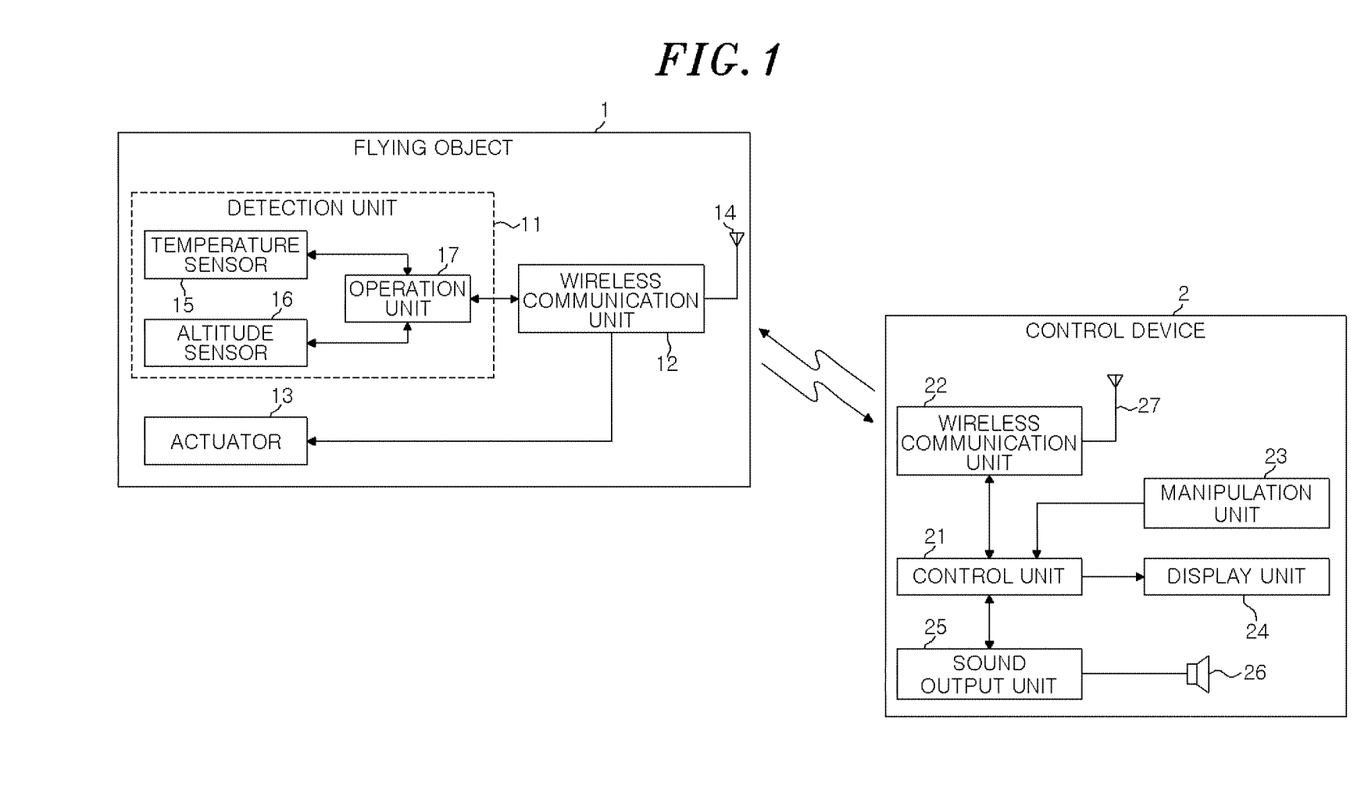
FIG. 1 is a block diagram showing a flying object and a control device according to a first embodiment.

FIG. 1 is a block diagram showing a flying object 1 and a control device 2 according to the first embodiment. In each embodiment of the disclosure, the flying object 1 is a wirelessly controlled model glider and the control device 2 is used by a user to wirelessly control the model glider.

As illustrated, the flying object 1 that is a model glider includes a detection unit 11, a wireless communication unit 12, an actuator 13, and an antenna 14 for wireless communication. The detection unit 11 is an integrated unit including a temperature sensor 15, an altitude sensor 16, and an operation unit 17.

The wireless communication unit 12 performs wireless communication with the control device 2.

The actuator 13 is connected to a rudder (not shown). The actuator 13 drives the rudder based on steering information received from the control device 2 through the wireless communication unit 12.

The operation unit 17 has, e.g., a microcomputer, and performs various computing processes. The operation unit 17 sequentially acquires temperature information detected by the temperature sensor 15. Further, the operation unit 17 sequentially acquires altitude information detected by the altitude sensor 16.

The temperature sensor may detect a temperature or a temperature variation.

The altitude sensor may detect an altitude or an altitude variation.

The operation unit 17 generates a transmission information to be transmitted to the control device 2 by using the temperature information and the altitude information. The transmission information is transmitted to the control device 2 through the wireless communication unit 12. The transmission information includes temperature information, information on temperature variation, or the like at an arbitrary constant altitude. An operation process of the operation unit 17 for generating the transmission information will be described later.

The control device 2 includes a control unit 21, a wireless communication unit 22, a manipulation unit 23, a display unit 24, a sound output unit 25, a speaker 26, and an antenna 27 for wireless communication.

The wireless communication unit 22 performs wireless communication with the wireless communication unit 12 of the flying object 1. In other words, the wireless communication unit 22 transmits the steering information or receives the transmission information generated by the operation unit 17.

The manipulation unit 23 represents various manipulation members provided at the control device 2. A manipulation signal by user's manipulation of the manipulation unit 23 is supplied to the control unit 21.

The display unit 24 displays information for the user. The display unit 24 includes, e.g., a liquid crystal panel, an organic EL (Electroluminescence) display panel, an LED light emitting unit, and the like.

The sound output unit 25 generates a sound signal, e.g., electronic sound, voice message, or the like. The sound signal may be outputted as a voice from the speaker 26 and thus the user can be provided with information as sound.

The control unit 21 has, e.g., a microcomputer, and performs various control processes and computing processes. For example, the control unit 21 generates the steering information to be transmitted to the flying object 1 in response to the manipulation signal from the manipulation unit 23 and transmits the steering information to the flying object 1 through the wireless communication unit 22.

Further, the control unit 21 controls display contents and a display state of the display unit 24 or controls the sound output unit 25 to output the sound signal.

A user who uses the flying object 1, such as a model glider, and the control device 2 needs to detect an air current in order to control the flying object 1. In the present embodiment, the flying object 1 and the control device 2 determine one or both of an ascending air current (thermal) and a descending air current and present the determination result as a display output or a sound output to the user who manipulates the control device 2.

Figure 2:
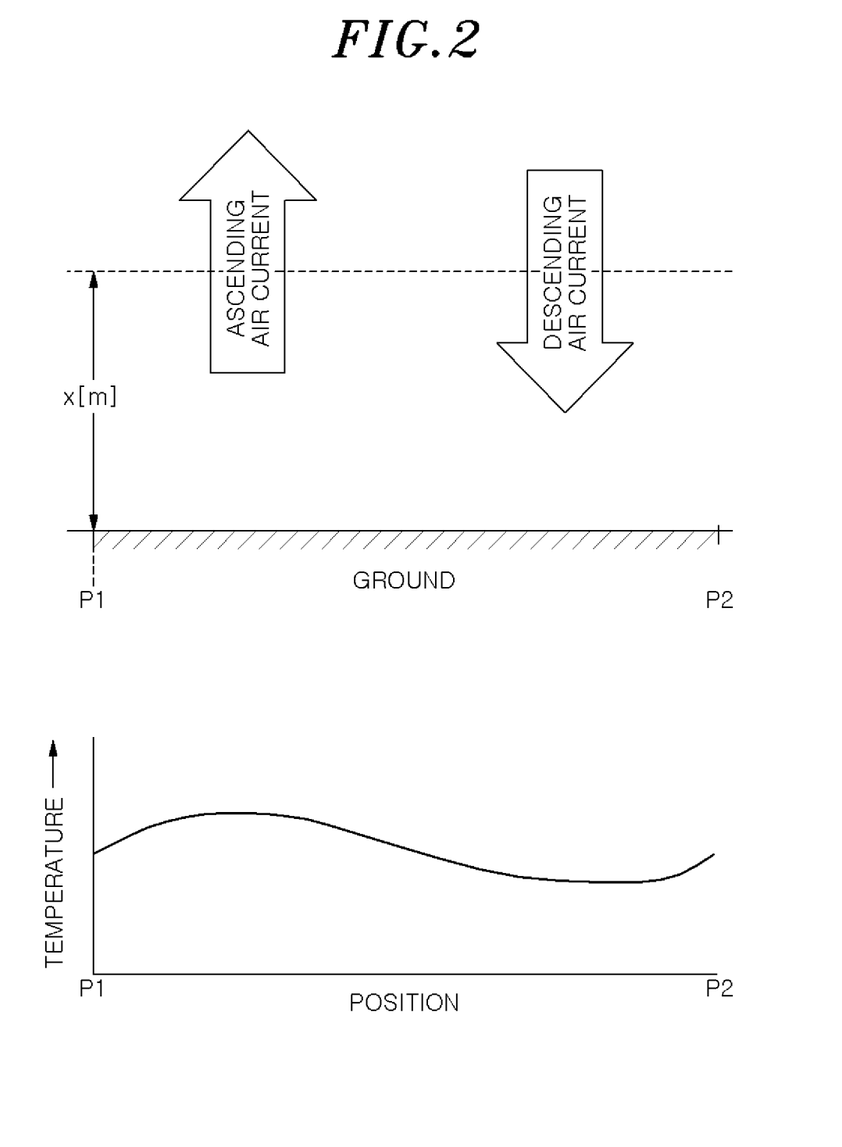
FIG. 2 explains an ascending air current, a descending air current and a temperature state.

FIG. 2 shows relation between an ascending air current, a descending air current and a temperature. For example, it is assumed that the ascending air current and the descending air current are generated between positions P1 and P2 as shown in an upper side of FIG. 2. In this case, a temperature at a certain altitude x[m] changes between the positions P1 and P2 as shown in a lower side of FIG. 2. In other words, the temperature is high at a position where the ascending air current is being generated and low at a position where the descending air current is being generated. Whether the air current is ascending or descending can be determined by monitoring such temperature variation.

However, the temperature also changes depending on altitude. In general, the temperature changes by 0.6° C. every 100 meters in a vertical direction. Further, the altitude of the flying object 1, such as a glider or the like, changes comparatively greatly by various factors even during level flight.

Figure 3:
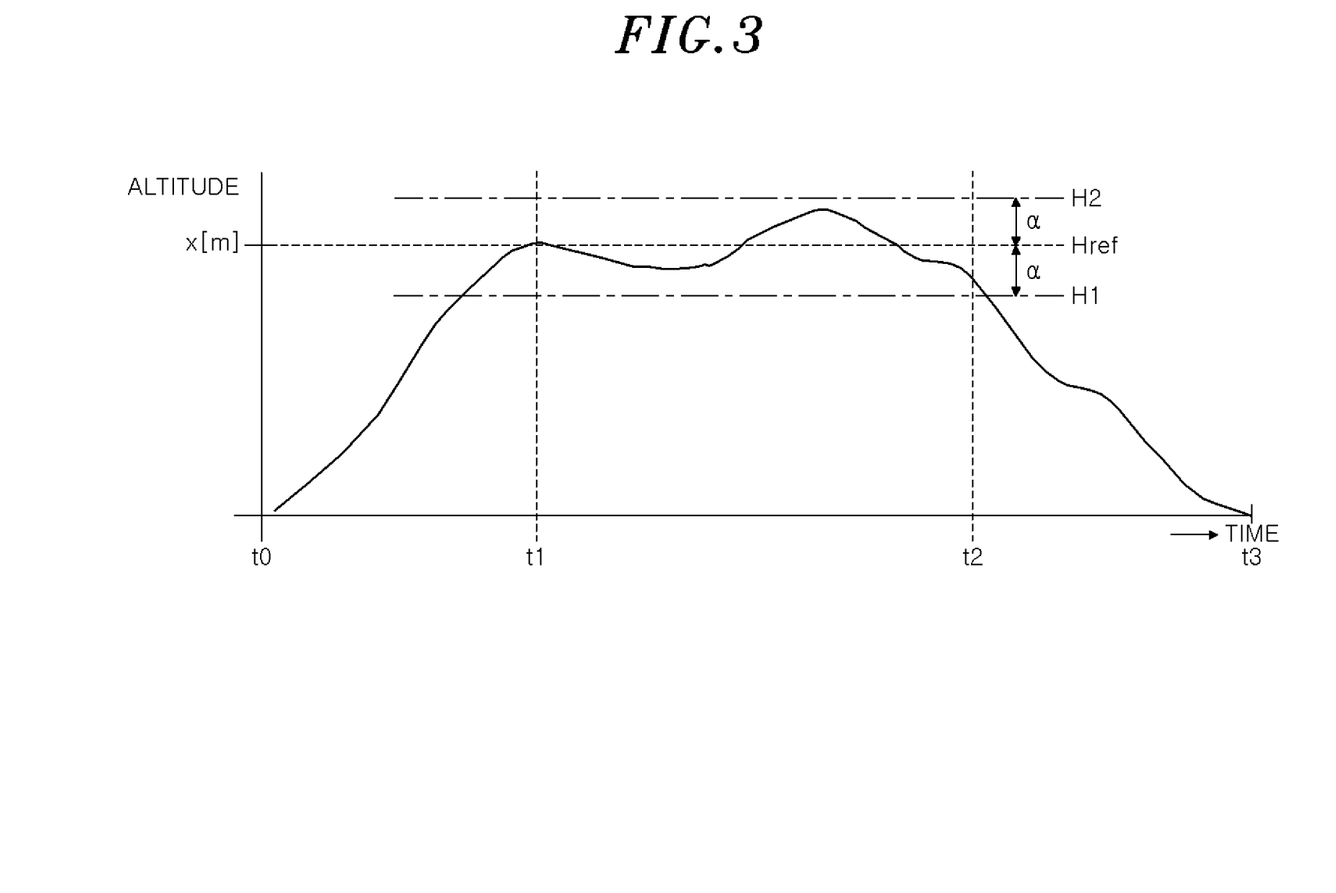
FIG. 3 explains an air current determining operation according to the first embodiment.

FIG. 3 shows altitude change from takeoff to landing of the flying object 1, for example. It is assumed that the flying object 1 took off at time t0 and made level flight at time t1. Then, the flying object 1 began to descend at time t2 and landed at time t3. In this case, although the flying object 1 had level flight from the time t1 to the time t2, the altitude of the flying object 1 actually changed comparatively greatly.

Given this situation, since the temperature changes are affected by the altitude as well as the air current, it is difficult to accurately determine the air current even by monitoring the temperature changes detected by the temperature sensor 15 provided at the fuselage.

Therefore, in the present embodiment, the operation unit 17 corrects the temperature information detected by the temperature sensor 15 by using the altitude information detected by the altitude sensor 16 and generates the transmission information based on the corrected temperature information. Specifically, the transmission information indicates the information on temperature variation at a constant altitude. The wireless communication unit 12 transmits the transmission information generated by the operation unit 17 to the control device 2.

The control device 2 determines whether the air current is ascending or descending based on the transmission information (information on the temperature variation) received through the wireless communication unit 22, and then presents the determination result to the user.

The operations mentioned above will be described in detail with reference to FIGS. 4 and 5.

Figure 4:
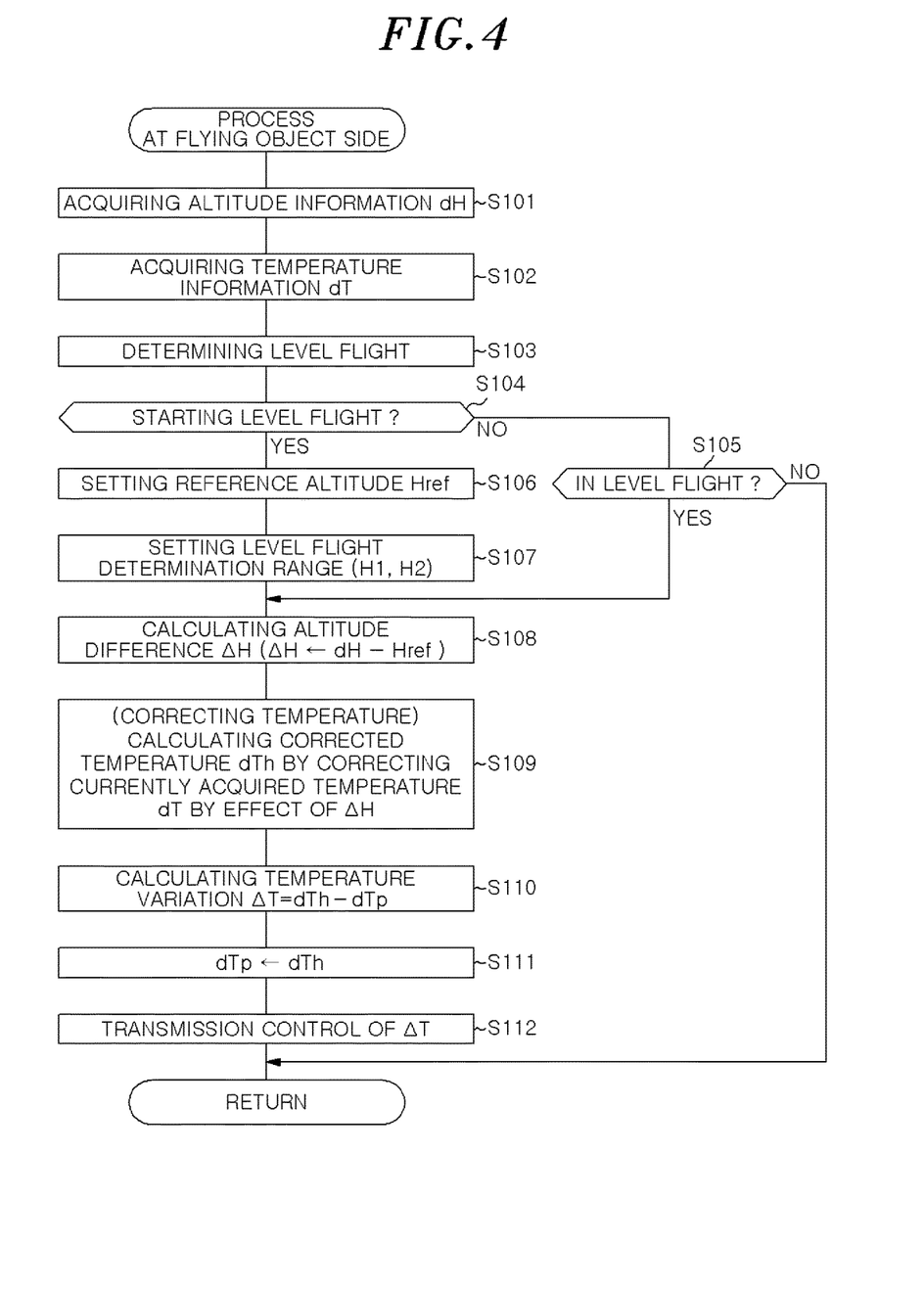
FIG. 4 is a flowchart of a process at the flying object side according to the first embodiment.

FIG. 4 shows an exemplary process of the operation unit 17 of the flying object 1. In this example, the operation unit 17 sequentially acquires altitude values as altitude information from the altitude sensor 16 and sequentially acquires temperature values as temperature information from the temperature sensor 15.

Alternatively, the altitude variation and the temperature variation may be outputted as altitude information and temperature information from the altitude sensor 16 and the temperature sensor 15, respectively. In this case, the calculation of the variation may not be required in the following processes. Further, the altitude information and the temperature information may be obtained as relative values with respect to a certain value.

In a step S101, the operation unit 17 acquires altitude information dH from the altitude sensor 16. In a step S102, the operation unit 17 acquires temperature information dT from the temperature sensor 15.

Whenever the altitude information dH and the temperature information dT are acquired at a predetermined time interval, the operation unit 17 executes a step S103 and subsequent steps shown in FIG. 4.

In the step S103, the operation unit 17 determines whether the flying object 1 is currently in level flight. In other words, for example, it is determined whether or not the flying object 1 is in a flight state between the time t1 and the time t2 shown in FIG. 3 (except an ascending state for takeoff and a descending state for landing).

This can be determined by checking whether a time period in which the altitude is increasing (or decreasing) is longer than a certain time period. Further, once the flying object 1 starts level flight, whether the level flight is continued or not can be determined by checking whether or not the altitude is within a level flight determination range to be described later.

In the step S103, determination of "ascending", "level flight" or "descending" is performed.

After the takeoff, when the result of the level flight determination in the step S103 is "ascending" or "descending", a step S104, a step S105 and RETURN are sequentially performed to finish the process of FIG. 4. Then, after a predetermined time, the process of FIG. 4 is repeated from the step S101.

When the determination result in the step S103 is shifted from "ascending" to "level flight", the operation unit 17 determines that the level flight has started in the step 104 and proceeds from the step S104 to a step S106 to set a reference altitude Href. For example, the altitude detected as the altitude information dH at that time is set as the reference altitude Href.

In a step S107, the operation unit 17 sets altitudes H1 and H2 as the level flight determination range. For example, as shown in FIG. 3, an altitudes higher by α[m] than the reference altitude Href and an altitude lower by α[m] than the reference altitude Href are set to H2 and H1, respectively.

As described above, even during the level flight, the fuselage moves up and down. The altitudes H1 and H2 are threshold values, as one reference, for determining whether the level flight is continued. In other words, when the altitude detected in the step S103 thereafter is between H1 and H2, it may be determined that the level flight is being continued.

After the above-described settings, the process proceeds to a step S108.

During a period in which the determination result in the step S103 is "level flight", the operation unit 17 operates in the order of the step S103→the step S104→the step S105→the step S108.

In other words, during a period in which the determination result is kept as level flight after the determination result is shifted to the level flight, the operation unit 17 operates in the order of the step S103→the step S104→the step S105→the step S108 step→ . . . →a step S112 whenever the process of FIG. 4 is performed.

In the step S108, the operation unit 17 calculates an altitude difference ΔH between the reference altitude Href and the currently acquired altitude information dH. When the level flight is started, the altitude information dH is equal to the reference altitude Href, so that the altitude difference ΔH becomes zero. Thereafter the altitude difference ΔH is obtained due to altitude changes.

In a step S109, the operation unit 17 corrects the currently acquired temperature information dT by using the altitude difference ΔH. For example, a corrected temperature dTh is obtained by correcting the temperature information dT at a ratio of, e.g., 0.6° C./100 m.

For example, when the altitude is higher than the reference altitude Href by 50 m, the temperature obtained by subtracting 0.3° C. from the temperature information dT becomes the corrected temperature dTh.

In a step S110, the operation unit 17 calculates temperature variation ΔT between the current corrected temperature dTh and the previous corrected temperature dTp (ΔT=dTh−dTp).

In a step S111, the operation unit 17 applies the current corrected temperature dTh to "the previous corrected temperature dTp" to be used in the next process.

In the step S112, the operation unit 17 transmits the temperature variation ΔT calculated in the step S110 as the transmission information to the control device 2 through the wireless communication unit 12.

Alternatively, the temperature variation ΔT may be set as a difference between the current corrected temperature and the temperature at the reference altitude Href, instead of a difference between the current corrected temperature and the previous corrected temperature.

Figure 8A:
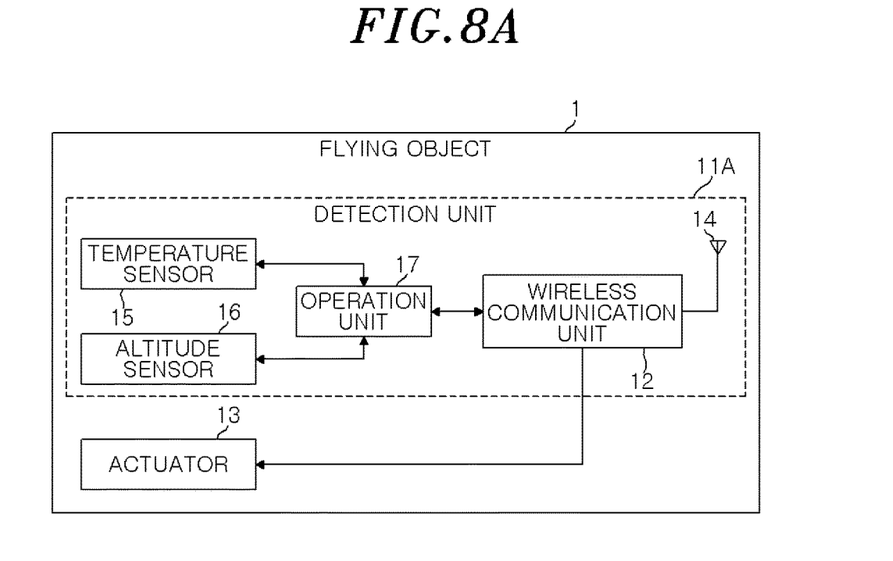
FIG. 8A is a block diagram showing a flying object according to a third embodiment.

In this case, when the reference altitude Href is set in the step S106, for example, the detected temperature dT is set to the reference temperature dTr. Then, in the step S110, the temperature variation is calculated by an equation ΔT=dTh−dTr. In this case, the step S111 is not necessary, which is the same in embodiments described in FIGS. 6 and 8.

When the flying object 1 starts to descend for landing, it is determined in the step S103 that the flying object 1 is not in level flight at a certain point in time. In that case, the operation unit 17 operates in the order of the step S103→the step S104→the step S105→RETURN. Accordingly, the process of FIG. 4 in this turn is finished and the process returns to the step S101.

After the flying object 1 starts level flight, when the flying object 1 deviates from the altitude range between H1 and H2, e.g., when the flying object 1 is ascending or descending to change a gliding altitude, it is determined that the flying object 1 is not in level flight. In that case, the operation unit 17 operates in the order of the step S103→the step S104→the step S105→RETURN. Accordingly, in this turn, the operation unit 17 finishes the process of FIG. 4 and returns to the step S101.

Therefore, during the period, e.g., from t1 to t2 in FIG. 3, in which the flying object 1 is substantially in level flight, it is determined that the flying object 1 is in level flight. During that period, the temperature variation ΔT is repeatedly transmitted to the control device 1 by the operations in steps S108 to S112.

Since the temperature variation ΔT is the variation of the temperature corrected in the step S109, the temperature variation ΔT is recognized as the temperature variation ΔT obtained when the flying object 1 moves horizontally at the reference altitude Href without any altitude change.

Figure 5:
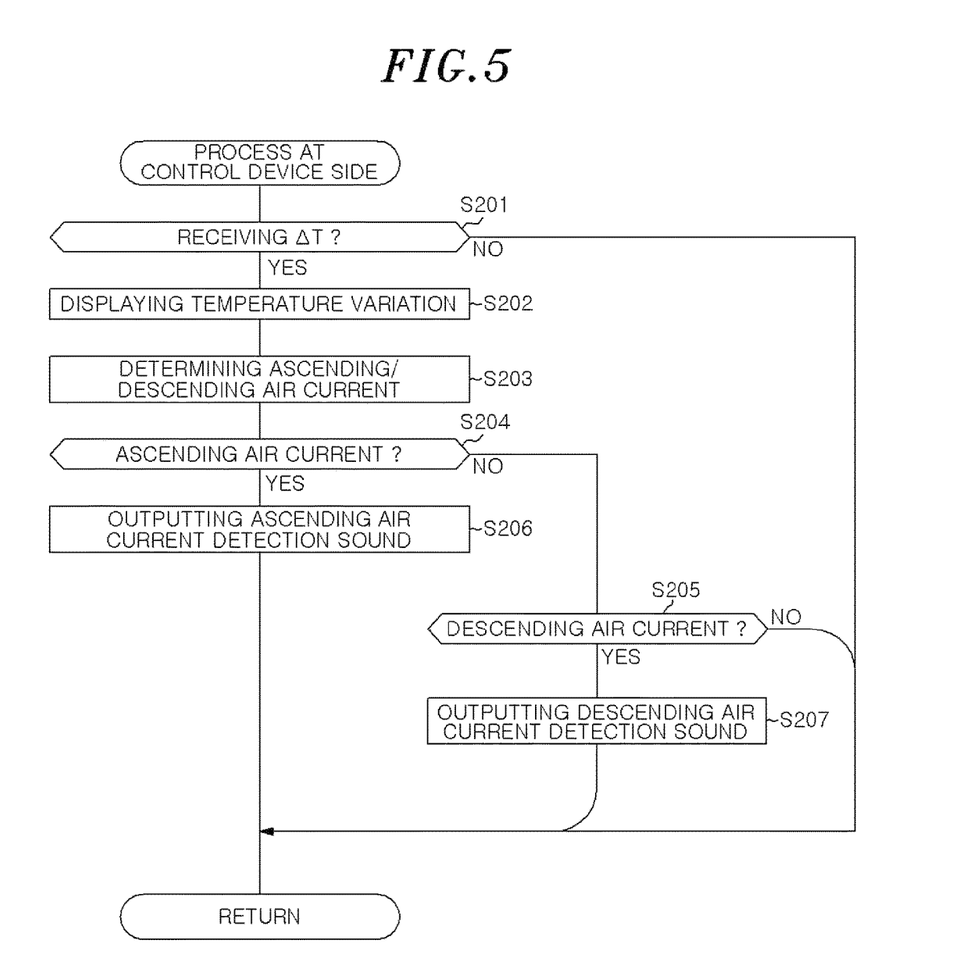
FIG. 5 is a flowchart of a process at the control device side according to the first embodiment.

In response to the transmission from the flying object 1, the control unit 21 of the control device 2 performs a process of FIG. 5.

Whenever the temperature variation ΔT is received as the transmission information from the flying object 1 in a step S201, the control unit 21 performs a step S202.

In the step S202, the control unit 21 makes the display unit 24 display a value as the temperature variation based on the received temperature variation ΔT. By displaying the received temperature variation ΔT as a numerical value or a graph, for example, the user can estimate the air current through the display unit 24.

In a step S203, the control unit 21 determines whether the air current is ascending or descending. For example, the control unit 21 stores the sequentially received temperature variation ΔT and becomes available to determine the air current when a certain number of temporally consecutive samples (temperature variations ΔT) are acquired. For example, the temperature changes shown in the lower side of FIG. 2 can be recognized by consecutively receiving the temperature variation ΔT. Accordingly, it is possible to estimate whether the fuselage is in an ascending air current or a descending air current.

If it is not possible to determine the air current due to insufficient number of samples or the incapability of observing the temperature changes, the control unit 21 operates in the order of the step S203→a step S204→a step S205→RETURN and the control unit 21 finishes the process of FIG. 5 in this turn.

In the case of calculating the temperature variation ΔT as a difference between the current corrected temperature and the temperature at the reference altitude Href (ΔT=dTh−dTr), instead of a difference between the current corrected temperature and the previous corrected temperature (ΔT=dTh−dTp) as described above, whether the air current is ascending or descending may be determined by a single sample. This is because a single value itself is the difference with respect to the temperature at the reference altitude Href and thus indicates an ascending air current or a descending air current.

When it is determined that the fuselage is currently in an ascending air current in the step S204, the control unit 21 performs a step S206 to control the sound output unit 25 to output an ascending air current detection sound (or message) and, at the same time, may control the display unit 24 to display the ascending air current detection. Or, only the ascending air current detection may be displayed on the display unit 24 without the sound output.

When it is determined that the fuselage is currently in a descending air current in the step S205, the control unit 21 performs a step S207 to control the sound output unit 25 to output a descending air current detection sound (or message) and, at the same time, may control the display unit 24 to display the descending air current detection. Or, only the descending air current detection may be displayed on the display unit 24 without the sound output.

When the temperature variation ΔT is received from the flying object 1, the control unit 21 performs the process of FIG. 5 and, thus, the user can recognize whether the flying object 1 is in an ascending air current or a descending air current.

Further, the control device 2 may present either one of the ascending air current detection or the descending air current detection.

Second Embodiment

A second embodiment will be described with reference to FIGS. 6 and 7. A configuration of the second embodiment is the same as that shown in FIG. 1 except that the operation unit 17 of the flying object 1 itself determines whether the air current is ascending or descending.

Figure 6:
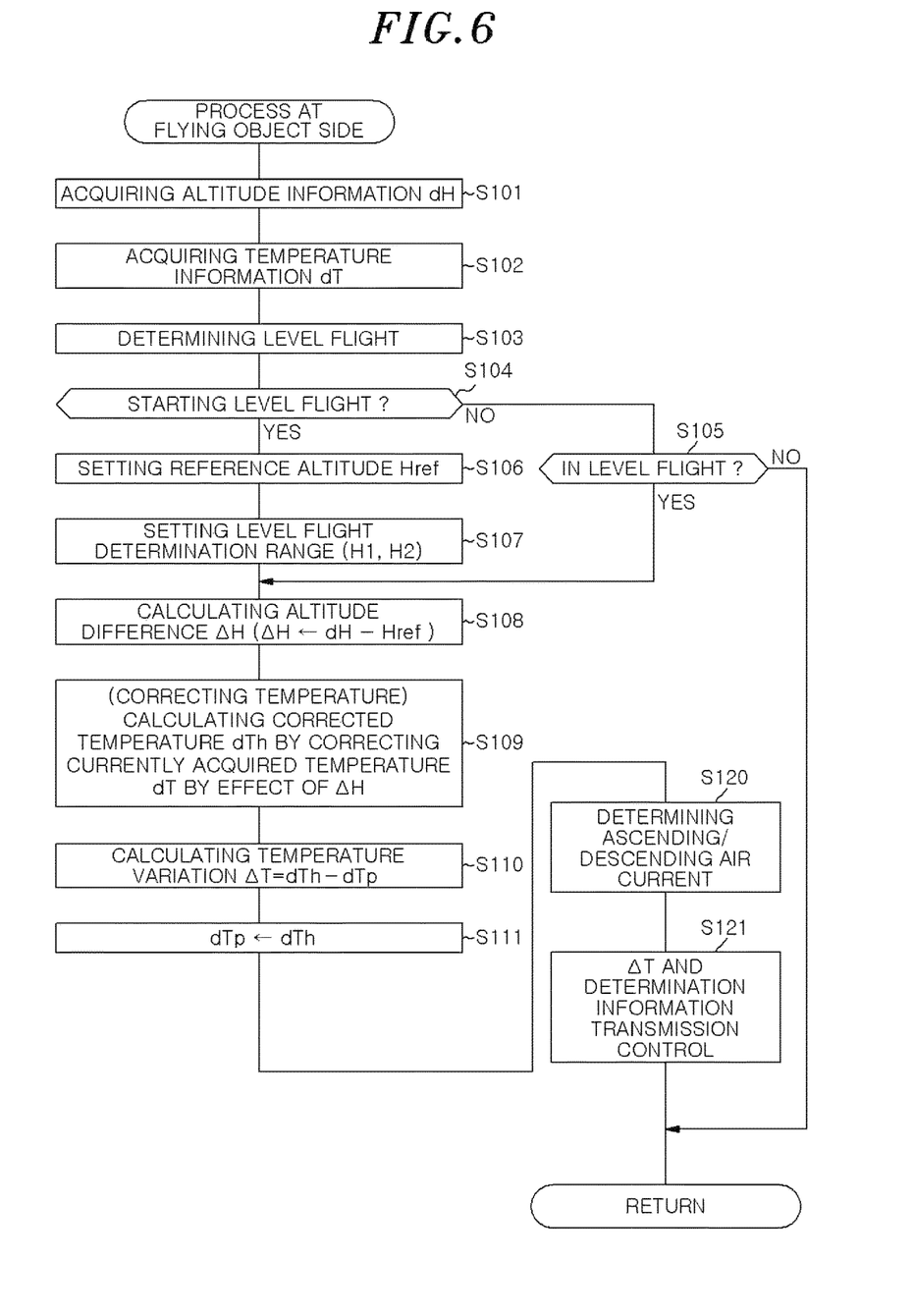
FIG. 6 is a flowchart of a process at a flying object side according to a second embodiment.

FIG. 6 shows an exemplary process of the operation unit 17. The steps S101 to S111 are the same as those in FIG. 4, so that the redundant description thereof will be omitted.

In the example of FIG. 6, the temperature information is corrected based on the altitude difference in the steps S108 to S111 and the temperature variation ΔT is calculated. Next, in a step S120, the operation unit 17 determines whether the air current is ascending or descending.

For example, the operation unit 17 stores the sequentially calculated temperature variations ΔT and becomes available to determine the air current when a certain number of temporally consecutive samples (temperature variations ΔT) are acquired.

The temperature changes shown in the lower side of FIG. 2 can be recognized by consecutively storing the temperature variations ΔT, for example. Thus, whether the fuselage is currently in an ascending air current or a descending air current can be estimated.

As a result, it is possible to determine whether the air current is "ascending", "descending" or "undeterminable".

In a step S121, the operation unit 17 transmits the temperature variation ΔT and the air current determination result as the transmission information to the control device 2 through the wireless communication unit 12.

Figure 7:
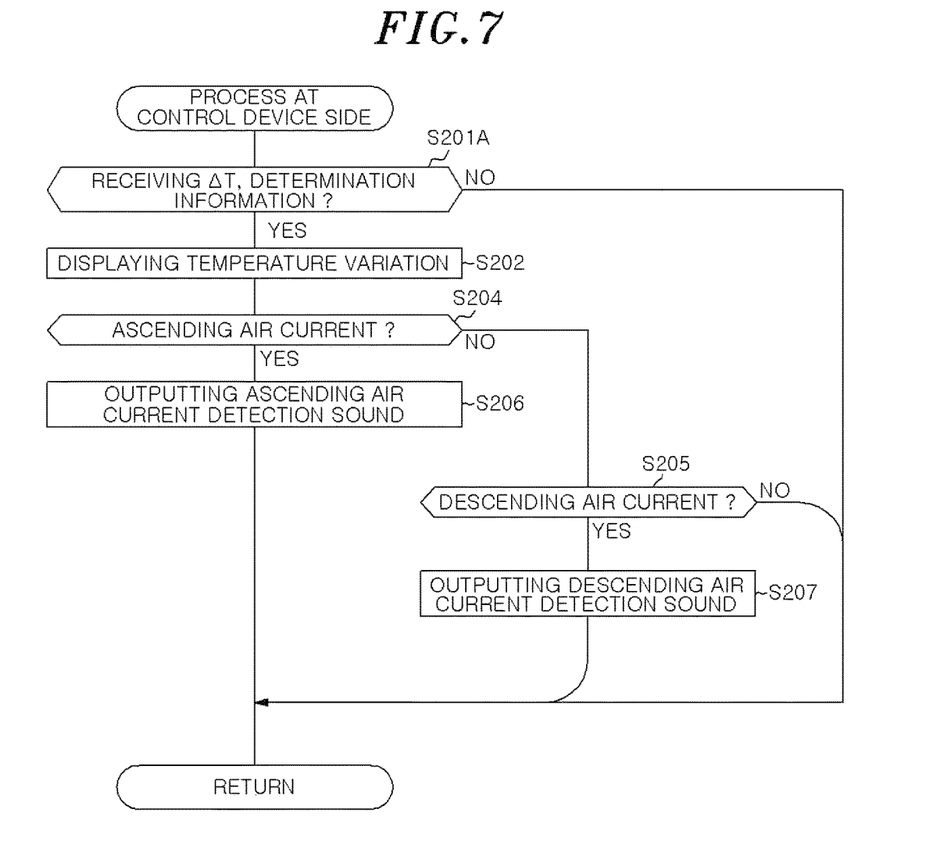
FIG. 7 is a flowchart of a process at a control device side according to the second embodiment.

The control unit 21 of the control device 2 performs a process of FIG. 7 in response to the transmission information.

When the information on the temperature variation ΔT and the air current determination result is received as the transmission information from the flying object 1 in a step S201A, the control unit 21 performs a step S202.

In a step S202, the control unit 21 displays a value as the temperature variation on the display unit 24 based on the received temperature variation ΔT.

Further, the control unit 21 checks the received air current determination result. When the determination result is "ascending" in a step S204, the control unit 21 performs a step S206 and controls the sound output unit 25 to output the ascending air current detection sound (or message). When the determination result is "descending" in a step S205, the control unit 21 performs a step S207 and controls the sound output unit 25 to output the descending air current detection sound (or message).

In the steps S206 and S207, the ascending air current detection or the descending air current detection may be displayed on the display unit 24 with or without the sound output.

When the received air current determination result is neither the information indicating the ascending air current nor the information indicating the descending air current, the control unit 21 operates in the order of the step S204→the step S205→RETURN and finishes the process of FIG. 7 in this turn without outputting the detection sound from the sound output unit 25.

As in the first embodiment, the user can recognize whether the flying object 1 is in an ascending air current or a descending air current. In addition, the control unit 21 of the control device 2 does not perform the air current determination and, thus, the processing load is reduced.

Third Embodiment

A third embodiment will be described with reference to FIG. 8A.

A configuration example of the flying object 1 in the third embodiment is different from the example shown in FIG. 1.

As shown in FIG. 8A, a detection unit 11A is installed at the flying object 1. The detection unit 11A is an integrated unit including a temperature sensor 15, an altitude sensor 16, an operation unit 17, a wireless communication unit 12 (and an antenna 14).

By employing the detection unit 11A configured as described above, the installation to the flying object 1 becomes easier. In other words, the flying object 1 for performing the process of FIG. 4 or FIG. 6 can be realized simply by connecting the actuator 13 of the flying object 1 and the detection unit 11A, which is very convenient when a user assembles a model glider, for example.

Fourth Embodiment

A fourth embodiment will be described with reference to FIG. 8B.

Figure 8B:
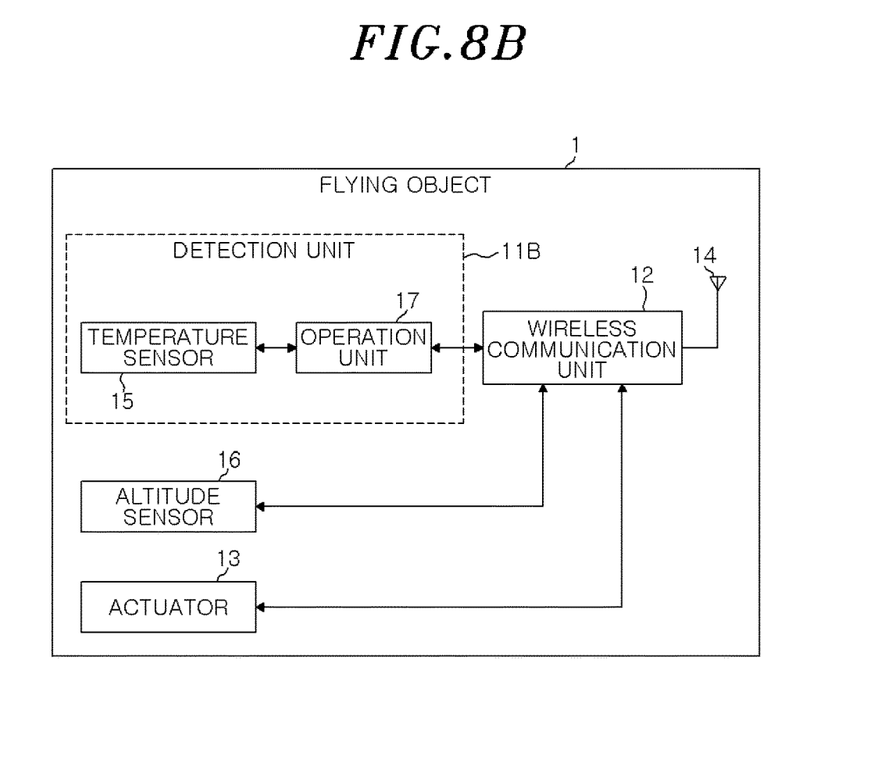
FIG. 8B is a block diagram showing a flying object according to a fourth embodiment.

As shown in FIG. 8B, a detection unit 11B is installed at a flying object 1. The detection unit 11B is an integrated unit including a temperature sensor 15 and an operation unit 17.

When the detection unit 11B configured as described above is installed at the flying object 1, the detection unit 11B is connected to the wireless communication unit 12.

Most model glider lovers have an altitude sensor or a GPS (Global Positioning System) sensor. Therefore, in the case of providing the detection unit 11B, a user can realize the flying object 1 for performing the process of FIG. 4 or FIG. 6 by using the model glider, the altitude sensor, and the like.

Fifth Embodiment

A fifth embodiment will be described with reference to FIGS. 9 and 10.

Figure 9:
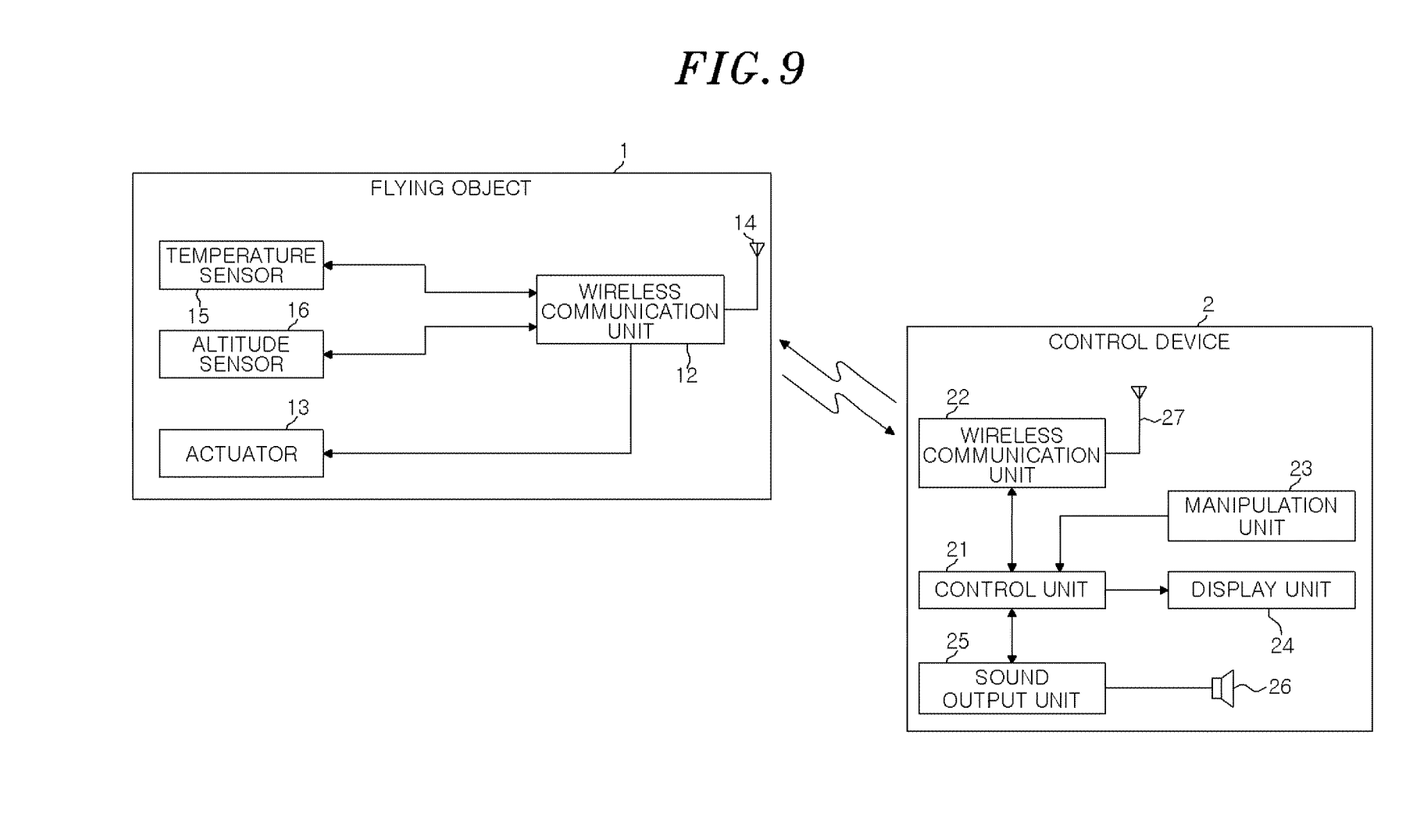
FIG. 9 is a block diagram showing a flying object and a control device according to a fifth embodiment.

FIG. 9 is a block diagram of the flying object 1 and the control device 2. In this example, the flying object 1 includes a temperature sensor 15, an altitude sensor 16, an actuator 13, a wireless communication unit 12, and an antenna 14.

The wireless communication unit 12 transmits the temperature information detected by the temperature sensor and the altitude information detected by the altitude sensor 16 to the control device 2 sequentially (e.g., at a predetermined time interval).

The configuration of the control device 2 is the same as that shown in FIG. 1 except that the control unit 21 receives the temperature information and the altitude information and performs the correction of the temperature information, the calculation of the temperature variation ΔT, and the air current determination. In other words, in this example, the operations performed by the operation unit 17 in the first and the second embodiment are performed by the control unit 21.

Figure 10:
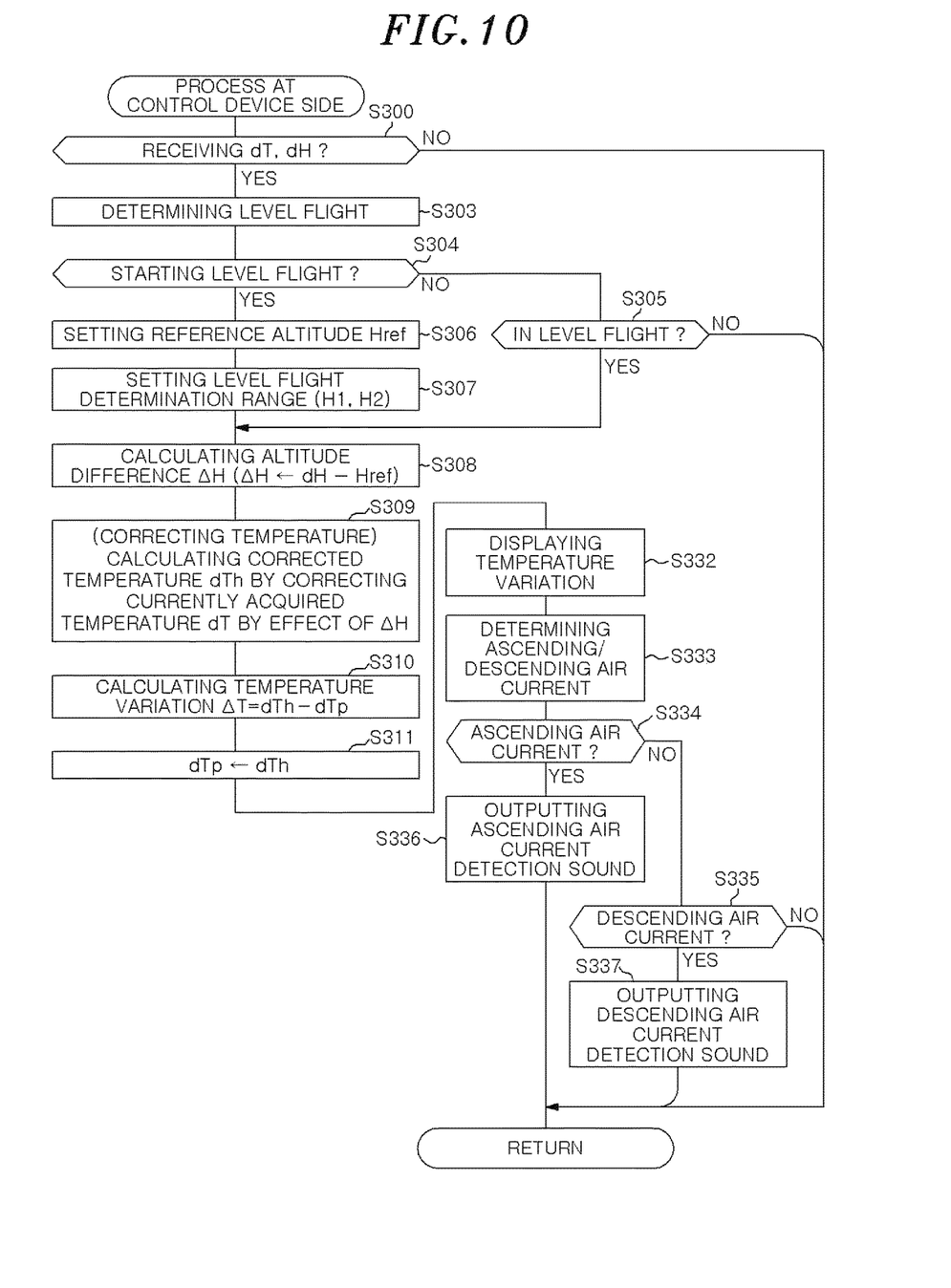
FIG. 10 is a flowchart of a process at the control device side according to the fifth embodiment.

FIG. 10 shows an exemplary process of the control unit 21.

Whenever receiving the temperature information dT and the altitude information dH as the transmission information from the flying object 1 in a step S300, the control unit 21 performs a step S303.

Steps S303 to S307 are the same as the steps S103 to S107 of FIG. 4 which are performed by the operation unit 17. In other words, the control unit 21 determines whether or not the flying object 1 is in level flight and sets the reference altitude Href and the level flight determination range (H1 and H2) when it is determined that the flying object 1 is in level flight. During a period in which it is determined that the flying object 1 is in level flight, the step S308 and the subsequent steps are executed.

Steps S308 to S311 are the same as the steps S108 to S111 of FIG. 4 which are performed by the operation unit 17. In other words, the control unit 21 calculates the altitude difference ΔH, obtains the corrected temperature dTh by correcting the temperature information dT by using the altitude difference ΔH, and calculates the temperature variation ΔT.

Steps S332 to S337 are the same as the steps S202 to S207 of FIG. 5. In other words, the control unit 21 controls the display of temperature changes by using the acquired information on the temperature variation ΔT and, at the same time, determines whether the air current is ascending or descending and outputs the detection sound or the like in response to the determination result.

In the fifth embodiment, similarly to the first embodiment, a user can recognize whether the flying object 1 is in an ascending air current or a descending air current.

Especially, in this example, the flying object 1 has a simple configuration, so that the weight of the flying object 1 can be reduced.

Summary and Modification

In the flying object 1 of the first to the fourth embodiment, the flying operation of the flying object 1 is controlled through wireless communication with the control device 2. Further, the flying object 1 of the first to the fourth embodiment includes the temperature sensor 15 and the altitude sensor 16.

The flying object 1 further includes the operation unit 17 for correcting the temperature information dT detected by the temperature sensor 15 to the temperature information (corrected temperature dTh) at an altitude by using the altitude information dH detected by the altitude sensor 16 and generating the transmission information based on the corrected temperature dTh. The flying object 1 further includes the wireless communication unit 12 for transmitting the transmission information generated by the operation unit 17 to the control device 2.

The altitude of the flying object such as a model glider or the like changes even during level flight. Therefore, the temperature changes obtained during the level flight are not those obtained at a same altitude and the effect of the altitude difference makes it difficult to detect the air current with high accuracy simply by measuring temperature changes. To that end, in the above-described embodiments, the temperature information at a same altitude is detected regardless of altitude changes by correcting the temperature information and the temperature information in which the effect of the altitude on the temperature changes is cancelled is obtained.

Accordingly, the temperature detection suitable for the air current detection can be performed and the high-accuracy air current detection can be realized.

In the flying object 1 of the first embodiment, the operation unit 17 generates as the transmission information the information on temperature changes at an altitude (temperature variation ΔT) and transmits the transmission information to the control device 2. The information on the temperature variation at an altitude is appropriately used for determining whether the air current is ascending or descending. The control device 2 receives the temperature variation ΔT as the transmission information and appropriately determines whether the air current is ascending or descending. Therefore, the high-accuracy thermal detection can be notified to a user (operator).

Further, the temperature variation ΔT may be obtained as a difference (ΔT=dTh−dTp) between the current corrected temperature dTh and the previous corrected temperature dTp or as a difference (ΔT=dTh−dTr) between the current corrected temperature dTh and the detected temperature at the reference altitude Href.

In the case of obtaining the difference ΔT=dTh−dTp, the air current can be determined by monitoring samples of the temperature variation ΔT.

In the case of obtaining the difference ΔT=dTh−dTr, a temperature variation ΔT indicates a temperature difference caused by the effect of air current at an altitude. Therefore, the air current can be determined by the single value. However, it is preferable to monitor a certain number of samples of the temperature variation in order to perform the determination more accurately.

In the flying object 1 of the second embodiment, the operation unit 17 determines whether the air current is ascending or descending based on the temperature variation ΔT at an altitude which is obtained from the corrected temperature dTh and transmits the determination result information as the transmission information to the control device 2.

In other words, the operation unit 17 determines whether the air current is ascending or descending based on the temperature variation ΔT at an altitude and transmits the determination result to the control device 2.

Therefore, the control device 2 can simply present the air current determination result and the thermal detection result to the operator with a simple and easy manner.

As described in the first and the second embodiment, the operation unit 17 corrects the temperature information and generates the transmission information (steps S108 to S112 in FIG. 4 or steps S108 to S121 in FIG. 6) during a period (determination period in steps S103 to S107) in which it is estimated from the altitude information dH that the altitude changes are within a predetermined range (between H1 and H2) and the flying object substantially levels off.

In other words, the air current determination (thermal detection) can be performed during substantial level flight, not during takeoff to a predetermined altitude or during landing. Therefore, a user can detect a thermal when the thermal detection is needed. Further, the thermal detection function is realized during the level flight which enables high-accuracy thermal detection, and the process efficiency is improved. Moreover, since the air current detection is not notified during takeoff or landing, the user is not confused.

In the first to the fourth embodiment, the detection units 11, 11A and 11B are exemplified as the detecting device of the disclosure. Each of the detection units 11, 11A and 11B serving as the detecting device installed at the flying object includes the operation unit 17 for correcting the inputted temperature information to the temperature information at an altitude by using the inputted altitude information and generating the transmission information based on the corrected temperature information.

By employing the detection units 11, 11A, and 11B, it is possible to easily realize the flying object 1 that corrects the detected temperature information dT to the temperature information at an altitude (corrected temperature dTh) by using the detected altitude information dH and generates the transmission information based on the corrected temperature dTh. For example, by providing the detection unit 11, 11A or 11B to a user having a model glider, the user can enjoy the effect of the disclosure by using the model glider together with detection unit.

The detection unit 11A of the third embodiment (FIG. 8A) further includes the wireless communication unit 12 for transmitting the transmission information generated by the operation unit 17 to the control device 2, the temperature sensor 15, and the altitude sensor 16. Accordingly, constituent components for realizing the function of the disclosure can be easily assembled.

The control device 2 of the fifth embodiment controls the operation of the flying object 1 through wireless communication. The control device 2 includes a notification unit, the wireless communication unit 22 and the control unit 21. The notification unit may include the sound output unit 25, the speaker 26 and the display 24. The wireless communication unit 22 receives the temperature information dT of the temperature sensor 15 installed at the flying object 1 and the altitude information dH of the altitude sensor 16 installed at the flying object 1. The control unit 21 corrects the temperature information dT received through the wireless communication unit 22 to the temperature information at an altitude (corrected temperature dTh) by using the received altitude information dH. The control unit 21 controls the output of the notification unit by determining whether or the air current is ascending or descending based on temperature changes at the altitude which are obtained from the corrected temperature dTh.

In other words, the control device receives the temperature information dT and the altitude information dH from the flying object 1, corrects the temperature information, and performs the air current determination. In this case, the temperature information in which the effect of the altitude on the temperature changes is canceled is obtained and used for the air current determination. Therefore, the high-accuracy air current detection can be realized and notified to the user.

In the above-described embodiments, the flying object 1 and the control device 2 perform the air current detection and the presentation thereof in the following sequence (1) to (4).

(1) The altitude information dH of the altitude sensor installed at the flying object 1 and the temperature information dT of the temperature sensor 15 installed at the flying object 1 are acquired.

(2) The acquired temperature information dT is corrected to the temperature information dTh at an altitude by using the acquired altitude information dH.

(3) Whether the air current is ascending or descending is determined based on the temperature variation ΔT at the altitude which is obtained from the corrected temperature information dTh.

(4) The control device 2 for controlling the operation of the flying object 1 through wireless communication presents the air current determination result.

By acquiring the temperature information at an altitude regardless of changes in the altitude of the flying object and determining whether the air current is ascending or descending in the above-described sequence, the air current can be determined with high accuracy without the effect of the altitude and the air current determination result can be notified to the user.

As described above, in the present embodiment, the air current can be determined with high accuracy. Further, by employing a simple and easy configuration, the load of the device is decreased.

A user (operator) can clearly recognize whether the flying object 1 in the sky is riding the thermal or not and thus can control the flying object 1 more accurately.

Especially, since the ascending air current and the descending air current can be found without depending on the movement of the fuselage, the control can be appropriately performed without mistakenly recognizing the movement of the fuselage by the ascending air current and the descending air current and the movement of the fuselage by defects of the fuselage or the like.

Further, whether the thermal exists or not can be determined even when it is difficult to check the movement of the fuselage flying at a high-altitude with naked eyes.

The disclosure is not limited to the above-described embodiments and various modifications may be made in the configuration and the processing.

In the above-described embodiments, the temperature is corrected and the temperature difference is notified during substantial level flight. However, as long as the flying object is flying, it is possible to correct the temperature and present the temperature difference constantly after takeoff. In that case, the reference altitude Href may be initially fixed.

The temperature sensor 15 and the altitude sensor 16 may be provided as one unit, not as separate members.

The operation unit 17, the temperature sensor 15, and the altitude sensor 16 may be separately provided and connected by bus wiring or the like without providing the detection unit 11 as an integrated device.

The corrected temperature information dTh may be transmitted with or without the temperature variation ΔT and the air current determination information from the flying object 1 to the control device 2. The control device 2 can detect the thermal by acquiring the temperature information dTh at an altitude at each timing.

The air current determination and the determination result presentation may be applied to either one of the ascending air current or the descending air current. Although the display output or the sound output is used in the above-described examples, a vibrator may be installed at the control device to notify a user by vibration with or without the display output and the sound output. For example, the control device may be vibrated in response to the thermal detection.

While the disclosure has been shown and described with respect to the embodiments, it will be understood by those skilled in the art that various changes and modifications may be made without departing from the scope of the disclosure as defined in the following claims.

What is claimed is:

1. A detecting device for a flying object whose operation is controlled through wireless communication with a control device, comprising:
    an operation unit configured to determine whether the flying object is in level flight; set a reference altitude when the flying object is in the level flight; correct first temperature information received from a temperature sensor installed at the flying object to second temperature information at the reference altitude by using altitude information received from an altitude sensor installed at the flying object; determine whether an air current is ascending or descending based on a temperature variation at the reference altitude, the temperature variation being obtained from the second temperature information; and generate transmission information including the air current determination result.

2. The detecting device of claim 1, further comprising:
a wireless communication unit configured to transmit the transmission information generated by the operation unit to the control device for the flying object.

3. The detecting device of claim 1, further comprising the temperature sensor.

4. The detecting device of claim 1, further comprising the altitude sensor.

5. A flying object whose operation is controlled through wireless communication with a control device, comprising:
a temperature sensor;
an altitude sensor;
an operation unit configured to determine whether the flying object is in level flight; set a reference altitude when the flying object is in the level flight; correct temperature information detected by the temperature sensor to temperature information at the reference altitude by using altitude information detected by the altitude sensor; and generate transmission information based on the corrected temperature information; and
a wireless communication unit configured to transmit the transmission information generated by the operation unit to the control device.

6. The flying object of claim 5, wherein the operation unit generates information on a temperature variation at the reference altitude as the transmission information.

7. The flying object of claim 6, wherein the operation unit determines whether an air current is ascending or descending based on the temperature variation at the reference altitude, the temperature variation being obtained from the corrected temperature information, and transmits information on the determination result as the transmission information.

8. The flying object of claim 5, wherein the operation unit corrects the temperature information and generates the transmission information during a period in which it is estimated from the altitude information that altitude changes are within a predetermined range so that the flying object is substantially in the level flight.

9. A control device for controlling an operation of a flying object through wireless communication, comprising:
a notification unit;
a wireless communication unit configured to receive altitude information of an altitude sensor installed at the flying object and temperature information of a temperature sensor installed at the flying object; and
a control unit configured to determine whether the flying object is in level flight; set a reference altitude when the flying object is in the level flight; correct the temperature information received through the wireless communication unit to temperature information at the reference altitude by using the altitude information received through the wireless communication unit; determine whether an air current is ascending or descending based on temperature changes at the reference altitude; the temperature changes being obtained from the corrected temperature information; and control an output of the notification unit based on the air current determination result.

10. An air current detection method comprising:
acquiring temperature information of a temperature sensor installed at a flying object and altitude information of an altitude sensor installed at the flying object;
determining whether the flying object is in level flight;
setting a reference altitude when the flying object is in the level flight;
correcting the acquired temperature information to temperature information at the reference altitude by using the acquired altitude information;
determining whether an air current is ascending or descending based on temperature changes at the reference altitude, the temperature changes being obtained from the corrected temperature information; and
notifying the air current determination result through a control device configured to control an operation of the flying object through wireless communication.

* * * * *